(12) United States Patent
Rao et al.

(10) Patent No.: US 11,823,384 B2
(45) Date of Patent: Nov. 21, 2023

(54) CT IMAGE GENERATION METHOD FOR ATTENUATION CORRECTION OF PET IMAGES

(71) Applicants: ZHEJIANG LAB, Zhejiang (CN); MINFOUND MEDICAL SYSTEMS CO., LTD, Zhejiang (CN)

(72) Inventors: Fan Rao, Hangzhou (CN); Wentao Zhu, Hangzhou (CN); Bao Yang, Hangzhou (CN); Ling Chen, Hangzhou (CN); Hongwei Ye, Hangzhou (CN)

(73) Assignees: ZHEJIANG LAB, Hangzhou (CN); MINFOUND MEDICAL SYSTEMS CO., LTD, Hangzhou (CN)

( * ) Notice: Subject to any disclaimer, the term of this patent is extended or adjusted under 35 U.S.C. 154(b) by 0 days.

(21) Appl. No.: 17/766,204

(22) PCT Filed: Jan. 23, 2021

(86) PCT No.: PCT/CN2021/073463
§ 371 (c)(1),
(2) Date: Jan. 3, 2023

(87) PCT Pub. No.: WO2021/169695
PCT Pub. Date: Sep. 2, 2021

(65) Prior Publication Data
US 2023/0121358 A1  Apr. 20, 2023

(30) Foreign Application Priority Data
Feb. 27, 2020  (CN) .......................... 202010125698.5

(51) Int. Cl.
G06T 7/00 (2017.01)

(52) U.S. Cl.
CPC .. *G06T 7/0012* (2013.01); *G06T 2207/10081* (2013.01); *G06T 2207/10104* (2013.01); *G06T 2207/20081* (2013.01)

(58) Field of Classification Search
CPC ......... G06T 7/0012; G06T 2207/10081; G06T 2207/10104; G06T 2207/20081
See application file for complete search history.

(56) References Cited

U.S. PATENT DOCUMENTS

2015/0221104 A1*  8/2015  Ra .......................... G06T 11/005
                                                                382/131
2017/0061629 A1*  3/2017  Zhu ....................... G06T 11/008
(Continued)

FOREIGN PATENT DOCUMENTS

CN       103054605 A       4/2013
CN       105147312 A      12/2015
(Continued)

OTHER PUBLICATIONS

International Search Report (PCT/CN2021/073463); dated May 8, 2021.
CN First Office Action(202010125698.5); dated Feb. 7, 2021.

*Primary Examiner* — Vu Le
*Assistant Examiner* — Winta Gebreslassie
(74) *Attorney, Agent, or Firm* — W&G Law Group

(57) ABSTRACT

Disclosed is a CT image generation method for attenuation correction of PET images. According to the method, a CT image and a PET image at T1 and a PET image at T2 are acquired and input into a trained deep learning network to obtain a CT image at T2; the CT image can be applied to the attenuation correction of the PET image, thereby obtaining more an accurate PET AC (Attenuation Correction) image. According to the CT image generation method for attenuation correction of PET images, the dosage of X-rays received by a patient in the whole image acquisition stage
(Continued)

can be reduced, and physiological and psychological pressure of the patient is relieved. In addition, the later image acquisition only needs a PET imaging device, without the need of PET/CT device, cost of imaging resource distribution can be reduced, and the imaging expense of the whole stage is reduced.

5 Claims, 2 Drawing Sheets

(56) References Cited

U.S. PATENT DOCUMENTS

| | | |
|---|---|---|
| 2017/0116497 A1 | 4/2017 | Georgescu et al. |
| 2018/0197317 A1 | 7/2018 | Cheng et al. |
| 2019/0026608 A1 | 1/2019 | Hsieh et al. |
| 2019/0130569 A1 | 5/2019 | Liu et al. |
| 2021/0090212 A1* | 3/2021 | Piat ................. G06T 3/0068 |
| 2022/0110600 A1* | 4/2022 | Chan ................. G06N 3/08 |

FOREIGN PATENT DOCUMENTS

| | | | | |
|---|---|---|---|---|
| CN | 106491151 A | 3/2017 | | |
| CN | 108389242 A | 8/2018 | | |
| CN | 108765294 A | 11/2018 | | |
| CN | 109272443 A | 1/2019 | | |
| CN | 109308728 A | 2/2019 | | |
| CN | 111436958 A | 7/2020 | | |
| KR | 20200057450 A | * | 11/2018 | ............... A61B 6/00 |

* cited by examiner

CT IMAGE GENERATION METHOD FOR ATTENUATION CORRECTION OF PET IMAGES

CROSS-REFERENCE TO RELATED APPLICATIONS

The present application is a National Phase of International Application No. PCT/CN2021/073463, filed on Jan. 23, 2021, which claims priority to Chinese Application No. 202010125698.5, filed on Feb. 27, 2020, the contents of both of which are incorporated herein by reference in their entireties.

TECHNICAL FIELD

The present disclosure relates to the field of medical image reconstruction, in particular to a CT image generation method based on deep learning and used for attenuation correction of PET images.

BACKGROUND

PET (Positron Emission Tomography) is a medical imaging technology widely used for functional, metabolic and receptor imaging in an anatomical form, and represents the latest and most advanced technology in the development of medical imaging. Different from CT (Computed Tomography) and MM (Magnetic Resonance Imaging) anatomical imaging, PET can observe the physiological and biochemical changes of the metabolic process, so as to find abnormalities and lesions before the changes of the biochemical blood concentration or body structure. PET is widely used in clinical tumor examination.

Before PET scanning, an isotope tracer is injected into a living organism. The tracer would participate in physiological metabolism, simultaneously it decays to produce positrons, and the positrons emitted by the tracer will have annihilation effects with neighboring electrons after continuing to travel 1 to 2 mm, resulting in a pair of γ photons with opposite directions (180° to each other) and equal energy (511 keV). In the process of passing through an object and entering a detector, γ photons will collide with the electrons in the object with a certain probability to produce a photoelectric effect or Compton scattering, which will make the γ photons disappear or their own energy be reduced, or their running direction be changed. When the photon energy is lower than the low-energy detection threshold of a PET device (usually 400-450 keV), the photons will not be effectively detected by the detector. In order to accurately quantify and analyze the distribution of radiopharmaceuticals in the body, it is necessary to correct the attenuation of γ rays. Attenuation correction can not only improve the contrast of PET images, but also obtain more accurate SUV (Standard Uptake Value) values, so as to improve the accuracy of quantitative analysis of the diseases.

Attenuation correction of PET images has been concerned in the field of medical image reconstruction, and many experts and scholars around the world have put forward their own methods. The computational correction method is the earliest attenuation correction method, which uses the ray intensity detected by the detector to calculate the original intensity of the rays. Although this method is simple, there are too many conditions and limitations in actual application of this method, for example, it is necessary to know the linear attenuation coefficient value of each pixel point and the distance between the photon emitted by the annihilation event at that point and the detector. When the shape of the object is irregular, these conditions are difficult to meet, which will affect the accuracy of attenuation correction. With the maturity of other attenuation correction methods, the scenarios where this method is used are less and less. A measurement correction method can also be used for attenuation correction of PET images, and blank scanning and transmission scanning are used to scan without patients and with patients respectively. Finally, the attenuation correction factor of any coincidence line is equal to the counting ratio of blank scanning and transmission scanning on this line. However, this method requires extra penetrating scanning operation, which will increase the scanning time and the imaging cost, and the radiation dose received by patients will also increase with this method. In addition, due to the limitations on the scanning time and source dose during penetrating scanning, the coincidence event count is often insufficient in actual use, which ultimately affects the effect of attenuation correction. Therefore, the attenuation correction factor obtained by the measurement correction method has great errors, which will eventually affect the accuracy of generating PET images, and in severe cases, artifacts will appear in PET images.

In recent years, with the rapid development of sensor technology and digital processing technology, researchers have developed PET/CT imaging devices by combining a PET device with a CT device. Because the X-ray used by a CT device and the γ-ray captured by a PET device are both high-frequency electromagnetic waves, of which the penetration ability and attenuation regulation in the human body are associated with each other to some extent, researchers focus more on the attenuation correction method based on CT data. Compared with PET, CT technology is more mature, and CT uses externally generated X-rays, which can provide a high-resolution diagnostic image, which is the distribution map of the attenuation coefficient of X-rays to human tissues and organs. Therefore, the data obtained by CT scanning can be used for attenuation correction of PET images. Compared with the traditional calculation correction method and measurement correction method, CT scanning has great advantages, such as a fast scanning speed, more information in patients, no interference to capturing 511 keV γ photons by PET sensors, low noise and so on. In the attenuation correction method based on CT data, the core idea is to convert the gray value of each pixel in the image generated by scanning the CT image at a specific tube voltage into an attenuation coefficient of γ photons with the energy of 511 keV, which is often called energy conversion. To solve this problem, many scholars have put forward their own methods, such as a proportional method, a segmentation calculation method and a bilinear transformation method. The proportional method firstly calculates the attenuation coefficient ratio of γ photons and X-rays (usually in the range of 50-80 keV) in water at the energy of 511 keV, and then multiplies it with the attenuation coefficient corresponding to the pixels of the CT image to complete attenuation correction. This method is relatively simple to use, and it is more accurate when the attenuation is mainly caused by Compton scattering. However, when there are tissues (such as bones) with a higher atomic number in the measured object, the error of this method is larger. X-ray mainly produces a photoelectric effect in tissues with a high atomic number such as bones, causing energy attenuation, while the energy of 511 keV γ gamma photons is very high, and the energy attenuation caused by the photoelectric effect has little influence on ray capture. The segmentation method is to divide the patient into three regions: soft tissues, bones and lung according to the CT images, and then convert the X-ray attenuation coefficient corresponding to the CT image of each region into an attenuation coefficient value of an energy of 511 keV. This method relies on accurate segmentation. However, when there are soft tissue areas with continuous bone transformation and similar tissue areas with a large density gradient in the measurement area, using only three discrete values to replace them is not accurate, which will lead to large errors. If the registration of the segmented CT image and PET image is inaccurate, the correction error will also increase. Many energy conversion methods generally have the advantages of difficulty in implementation and too many limited conditions.

SUMMARY

In view of the shortcomings of the prior art, the present disclosure provides a CT image generation method for attenuation correction of PET images. The method uses PET BP (Backprojection) images and CT images at time $T_1$ and PET BP images at time $T_2$ to generate CT images at time $T_2$. The method can reduce the X-ray radiation dose of patients in the whole process, thus reducing the pressure on patients' bodies or minds.

The purpose of the present disclosure is realized by the following technical solution: a CT image generation method for attenuation correction of PET images, comprising the following steps:

step 1: acquiring CT images and PET images of several patients at $T_1$ by a PET/CT device, and then acquiring CT images and PET images of the patients at $T_2$;

step 2: inputting the CT images and PET images at $T_1$ and $T_2$ acquired in step 1 into a deep learning network for training; taking the CT images and the PET images at $T_1$ and the PET images at $T_2$ as inputs, and taking the CT images at $T_2$ as labels, so that a loss function converges and stabilizes, and completing the training of the deep learning network; and step 3, using the PET/CT device to acquire a CT image and a PET image of a new patient at $T_1$, and acquiring a PET image of the new patient at $T_2$, and inputting the three images into the deep learning network trained in step 2 to obtain a CT image of the new patient at $T_2$.

Furthermore, the step 1 can also be implemented by: acquiring CT images and PET images of several patients at the time $T_1$ by the PET/CT device, and adding a deformation to the CT images and PET images acquired at the time $T_1$ by using non-rigid deformation models such as a thin-plate spline curve or a B-spline curve to generate PET images and CT images at the time $T_2$.

Furthermore, in the step 1, the pixels with the same coordinates of the CT images acquired at $T_1$ and the PET images acquired at $T_1$ correspond to the same positions in a body; the pixels with the same coordinates of the CT images at $T_2$ and the PET images at $T_2$ correspond to the same positions in the body.

Furthermore, in the deep learning network used in the step 2 is selected from UNet and GAN.

Furthermore, in the step 3, a back propagation method is used to train the deep learning network, so that the pixels with the same coordinates in the CT image of the new patient at $T_2$ and the PET image of the new patient at $T_2$ correspond to the same position in the body.

Furthermore, the PET image is a PET BP image, a PET NAC image or a PET FBP image.

The method provided by the present disclosure has the beneficial effects that when a patient needs multiple times of PET scanning, the anatomical information of the tissue only needs to be obtained by CT scanning for the first time, and CT scanning operation is not needed in subsequent PET scanning; the anatomical information needed by attenuation correction can be obtained by the information obtained by the first PET and CT scanning and the original image information or BP image information obtained by subsequent multiple times of PET scanning to be used for attenuation correction of PET images, so as to realize accurate PET reconstruction. The method of the present disclosure avoids the repeated operation of acquiring CT images of the patients, reduces the dose of X-rays received by the patients in the whole image acquisition stage, and relieves the physiological and psychological pressure of patients. In addition, only a PET imaging device is needed for subsequent measurement, without the need of PET/CT device, which can enhance the efficiency of imaging resource allocation and reduce the cost of imaging in the whole stage.

DESCRIPTION OF EMBODIMENTS

Next, the present disclosure will be described in detail according to examples and drawings.

EXAMPLE 1

Figure 1:
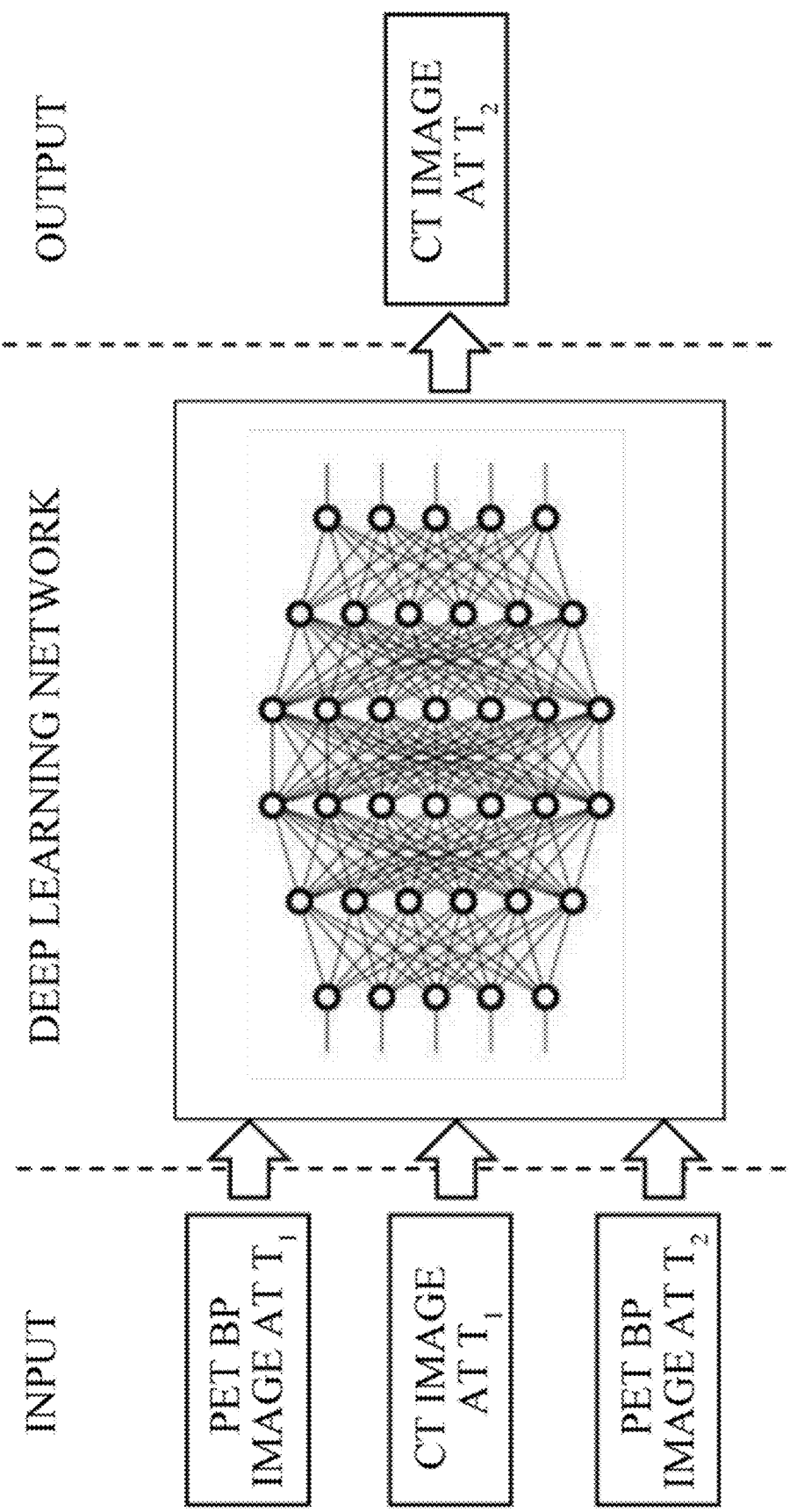
FIG. 1 is a flowchart of a CT image generation method based on attenuation correction of PET images.
Figure 2:
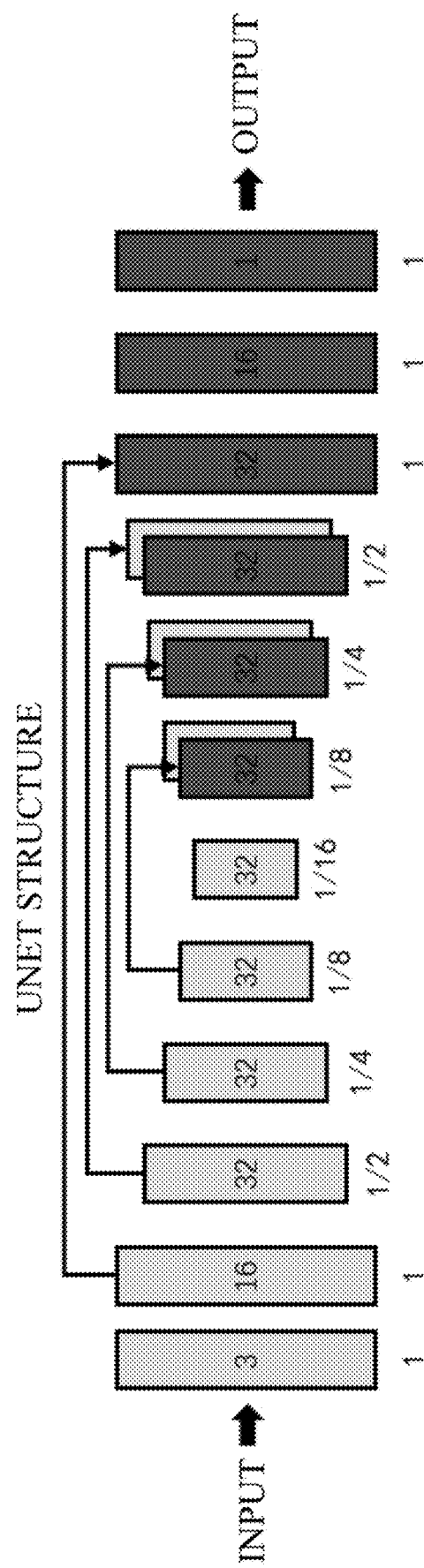
FIG. 2 shows a supervised learning network of UNet.

FIG. 1 is a flowchart of a CT image generation method for attenuation correction of PET images according to the present disclosure, which includes the following steps:

step 1, CT images and PET images of several patients at $T_1$ were acquired by a PET/CT device, and the pixels of the two images with the same coordinates corresponded to the same positions in the body; then, the CT images and PET images of the patients at $T_2$ were acquired, and the pixels of the two images with the same coordinates corresponded to the same position in the body; this was because that the CT image and PET image of the same person acquired at the same time correspond to the same anatomical information;

step 2, the CT images and the PET images at $T_1$ and the CT images and the PET images at $T_2$ acquired in step 1 were input into a deep learning network for training; the deep learning network used here was selected from UNet and GAN (General Adversarial Network); FIG. 2 shows the supervised learning network of UNet, the CT images and the PET images at $T_1$ and the PET images at $T_2$ were taken as inputs and the CT images were taken at $T_2$ as labels, so that the loss function converged and stabilized, and the training of the deep learning network was completed; here, the deep learning network was used to find the gray-scale correspondence between the PET image and CT image at $T_1$, and then convert the PET image at $T_2$ into a CT image;

step 3, the PET/CT device was used to acquire a CT image and a PET image of a new patient at $T_1$, and a PET image of the new patient at $T_2$, and the three images were input into the deep learning network trained in step 2 to obtain the CT image of the new patient at $T_2$; a back propagation method was used to train the deep learning network, so that the CT image of the new patient at $T_2$ was aligned with the PET image of the new patient at $T_2$.

The attenuation coefficient value of each pixel was generated from the CT image of the new patient at $T_2$ obtained in the above example, and based on the attenuation coefficient value, a clearer PET AC image could be generated to obtain a more accurate SUV value, so as to make a more accurate quantitative analysis of the diseases.

EXAMPLE 2

The present disclosure relates to a CT image generation method for attenuation correction of PET images, which comprises the following steps:

step 1, CT images and PET images of several patients were acquired at $T_1$ by a PET/CT device, and pixels with the same coordinates as the PET images at $T_1$ in the CT images corresponding to the same positions in the body; the pixels with the same coordinates of the CT images acquired at $T_1$ and the PET images acquired at $T_1$ corresponded to the same positions in a body; a non-rigid deformation model such as a thin-plate spline curve or a B-spline curve was used to add a deformation to the CT image and PET image acquired at $T_1$ to generate the PET image and CT image at $T_2$;

step 2: the CT images and the PET images at $T_1$ and the CT images and the PET images at $T_2$ acquired in step 1 were input into a deep learning network for training; the deep learning network used here was selected from UNet and GAN (General Adversarial Network); the CT images and the PET images at $T_1$ and the PET images at $T_2$ were taken as inputs, and the CT images at $T_2$ were taken as labels, the loss function converged and stabilized, and the training of the deep learning network was completed;

step 3, the PET/CT device was used to acquire a CT image and a PET image of a new patient at $T_1$, and a PET image of the new patient at T2, and the three images were input into the deep learning network trained in step 2 to obtain a CT images of the new patient at $T_2$; a back-propagation method was used to train the deep learning network, so that the CT image of the new patient at $T_2$ was aligned with the PET image of the new patient at $T_2$.

An attenuation coefficient value of each pixel was generated from the CT image of the new patient at $T_2$ obtained in the above example, and based on the attenuation coefficient value, a clearer PET image could be generated to obtain a more accurate SUV value, so as to make a more accurate quantitative analysis of the diseases.

The PET images used in the present disclosure were PET BP images, PET NAC (Non Attenuation Correction), PET FBP (Filtered Backprojection), etc.

The present disclosure is mainly used in a PET/CT device, but it can also be expanded to a PET/MRI device.

What is claimed is:

1. A computed tomography (CT) image generation method for attenuation correction of positron emission tomography (PET) images, comprising the following steps:
   step 1: acquiring CT images and PET images of several patients at $T_1$ by a PET/CT device, and then acquiring CT images and PET images of the patients at $T_2$;
   step 2: inputting the CT images and PET images at $T_1$ and the CT images and the PET images at $T_2$ acquired in step 1 into a deep learning network for training; taking the CT images and the PET images at $T_1$ and the PET images $T_2$ as inputs, and taking the CT images at $T_2$ as labels, so that a loss function converges and stabilizes, and completing the training of the deep learning network; and
   step 3: using the PET/CT device to acquire a CT image and a PET image of a new patient at new $T_1$, and acquiring a PET image of the new patient at new $T_2$, and inputting the three images into the deep learning network trained in step 2 to obtain a CT image of the new patient at the new $T_2$,
   wherein in the step 1, pixels with the same coordinates of the CT images acquired at $T_1$ and the PET images acquired at $T_1$ correspond to the same positions in a body; pixels with the same coordinates of the CT images at $T_2$ and the PET images at $T_2$ correspond to the same positions in the body.

2. The CT image generation method according to claim 1, wherein the step 1 can also be implemented by: acquiring CT images and PET images of several patients at the time $T_1$ by the PET/CT device, and adding a deformation to the CT images and PET images acquired at the time $T_1$ by using non-rigid deformation models including a thin-plate spline curve or a B spline curve to generate PET images and CT images at the time $T_2$.

3. The CT image generation method according to claim 1, wherein the deep learning network used in the step 2 is selected from UNet and general adversarial network (GAN).

4. The CT image generation method according to claim 1, wherein in the step 3, a back propagation method is used to train the deep learning network, so that the pixels with the same coordinates in the CT image of the new patient at $T_2$ and the PET image of the new patient at $T_2$ correspond to the same position in the body.

5. The CT image generation method according to claim 1, wherein the PET image is a PET backprojection (BP) image, a PET non attenuation correction (NAC) image or a PET filtered backprojection (FBP) image.

* * * * *